June 23, 1925.
R. W. STEM
COAL HANDLING PLANT
Filed March 15, 1924
1,543,627
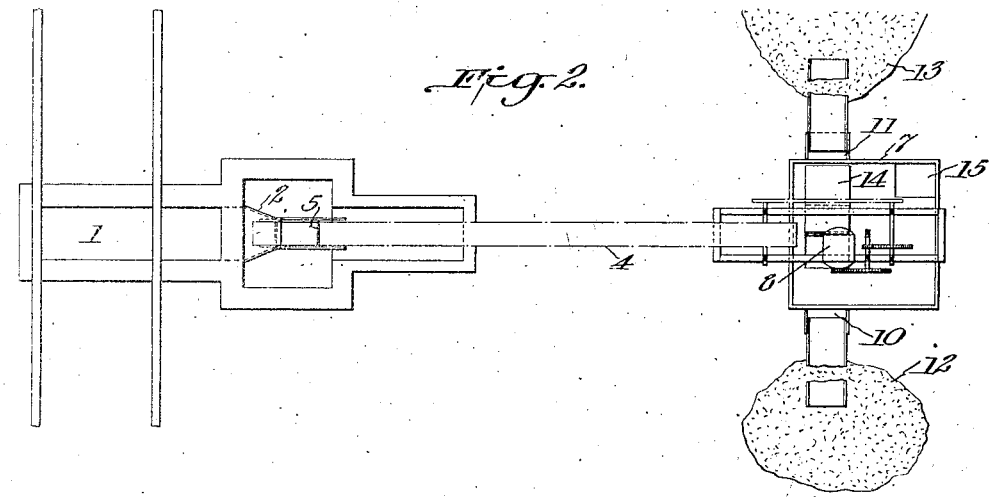
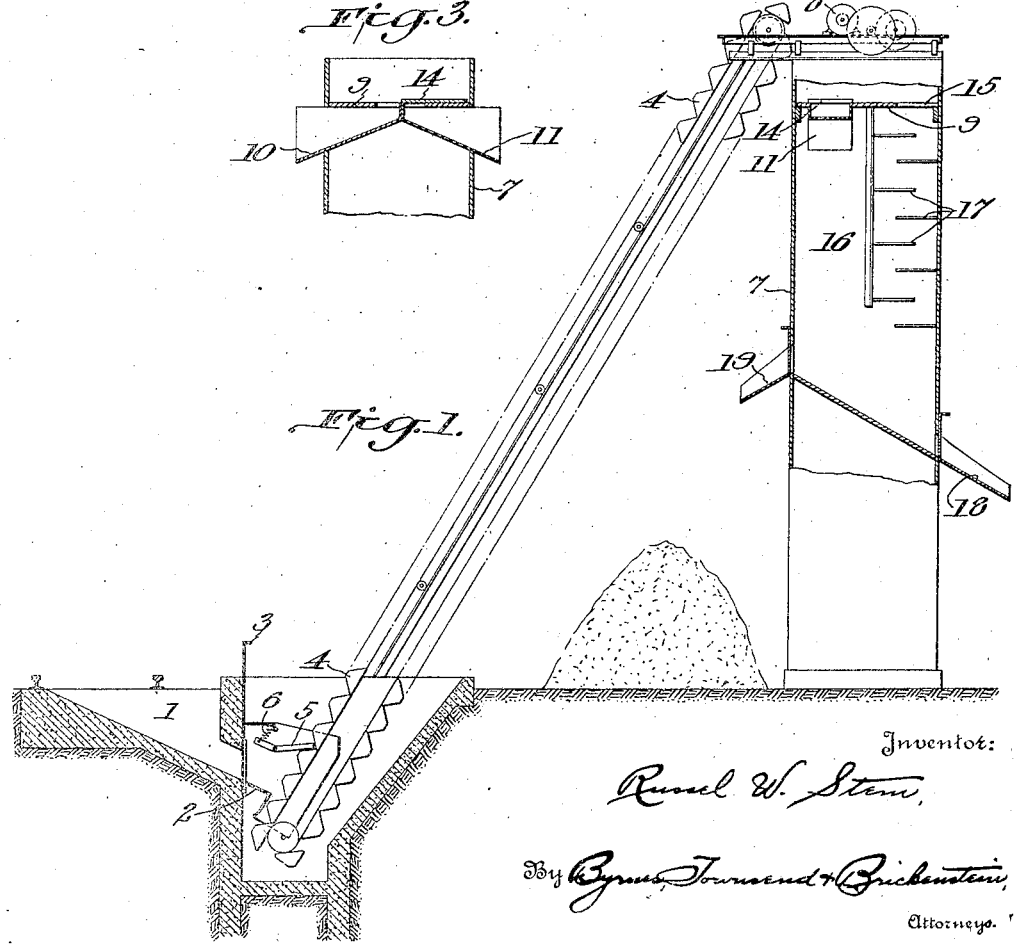
Inventor:
Russel W. Stem,
By Byrnes, Townsend & Brickenstein,
Attorneys.

Patented June 23, 1925.

1,543,627

UNITED STATES PATENT OFFICE.

RUSSEL W. STEM, OF BETHLEHEM, PENNSYLVANIA.

COAL-HANDLING PLANT.

Application filed March 15, 1924. Serial No. 699,561.

*To all whom it may concern:*

Be it known that I, RUSSEL W. STEM, a citizen of the United States of America, residing at Bethlehem, Pa., in the county of Lehigh and State of Pennsylvania, have invented certain new and useful Improvements in Coal-Handling Plants, of which the following is a specification.

This invention relates to a coal handling plant and particularly to a plant in which coal is transferred from a supply source, such for example as a track hopper, to an elevated bin of limited capacity, from which bin the coal may be delivered to wagons or to storage.

Various types of mechanical conveyors and coal storage systems have been proposed since the first use of conveying and elevating machinery in coal yards and many of the constructions have been found highly efficient under the particular conditions for which they were designed. The known systems contemplate the handling and storage of large quantities of coal and fall within two general classes, viz, the coal as unloaded or delivered at the yard is transferred either to ground storage or to overhead pockets. Overhead pockets are desirable, since the coal may be delivered by gravity to wagons, cars or the like and ground storage has the advantage of lower first cost.

The domestic retail coal dealer is not concerned, however, with the storage of large quantities of coal, since it is usually more difficult for him to secure coal than to sell it. The retail dealer can, as a rule, deliver coal at practically the same rate as it is received and rarely can stock more than ten per cent of the average daily receipts.

An object of the invention is to provide a coal handling plant, which is especially efficient in the handling of coal at yards where the coal can be delivered at about the same rate as it is received. More specifically an object of the invention is to provide a coal handling plant in which the coal is transferred from a supply hopper to an elevated point from which it may be delivered, by gravity, to storage pockets or piles, or alternately it may pass into an elevated bin of relatively low capacity, which bin is provided with chutes for delivering the coal to wagons or to another storage space. The invention also contemplates certain novel details of construction which render a plant of this type highly efficient in operation.

One embodiment of the invention is illustrated in the accompanying drawings, in which—

Fig. 1 is a side elevation, partly in section, of the coal handling plant.

Fig. 2 is a plan view of the same, and

Fig. 3 is a fragmentary vertical section through the top portion of the storage tower and illustrating one form of controlling gate.

In the drawing, the numeral 1 indicates the source from which the coal enters the plant, which source is here shown as a track hopper. The hopper communicates with a metal chute 2 having side walls which fit closely against the sides of a bucket conveyor 4. The buckets thus form a seal for the chute 2 and prevent the flowing of the coal when the elevator is not running, preferably however a gate 3 is also provided. A U-shaped bail 5 is pivotally supported on the chute 2 and is provided with a spring 6 for urging the crossbar of the bail downwardly. As the buckets move upwardly the bail scrapes over the tops of the buckets so that all coal above the upper edge of a bucket is thrown back into the chute 2 before the bucket leaves the chute. The bucket conveyor 4 delivers the coal to a distributing pocket at the top of a storage tower 7, which tower preferably carries the motor 8 and associated mechanism for operating the conveyor. The coal delivered to the distributing pocket or upper platform 9 of the tower 7 may pass, by means of chutes 10, 11 to storage piles 12, 13, respectively, in accordance with the positioning of the sliding gate 14. When the storage chutes are closed, however, the coal flows through the opening 15 in the platform 9 and into the storage bin 16 of the tower. Baffles 17 are preferably located below the opening 15 to reduce breakage, and the bin is provided with a chute 18 for delivering coal to wagons and with a chute 19 for delivering coal, with little or no breakage to storage at points close to the tower, or for emptying the bin to a storage pile when a car carrying a different kind of coal arrives before the bin is emptied.

Upon the arrival of a coal car, the car doors are opened to deliver the coal to the hopper 1 and the bucket conveyor is started. The gate 14 is positioned to close the storage chutes 10, 11 and the coal therefore flows into the limited capacity storage bin 16. If wagons or trucks are available the coal is transferred at once to the same by the delivery chute 18. When enough transportation is available, the entire plant functions exactly as the systems in which unlimited overhead pockets are provided, since the elevator is operated continuously until the car is emptied and all of the coal is delivered to the trucks from the overhead bin 16. If sufficient trucks are not available, the elevator may be stopped when the bin 16 fills, or if it is essential that the car be unloaded in the shortest time possible, the gate 14 may be moved to open one of the storage chutes, in which case the coal passes to a storage pile. It is usually unnecessary however to pass the coal to storage in yards which have an annual business not exceeding ten thousand tons. With one plant installation of this type it has been found that 95% of the coal handled was transferred from the track hopper to trucks without passing to ground storage, and in this plant the capacity of the storage bin was only two tons. It will be apparent therefore that a plant of this type provides a retail dealer with the substantial equivalent of a costly overhead pocket storage system and at a cost comparable with the cost of a ground storage system.

It is to be understood that the invention is not limited to the specific embodiment herein described. The actual number of storage chutes to which coal may be delivered from the tower and the means for controlling the flow through such chutes is not an essential feature of the invention. It is immaterial also whether the coal which is passed to storage from the tower goes to ground storage or to overhead pockets. It is therefore apparent that many changes which may be made in the various parts of the plant, their relative size, proportion and arrangement fall within the scope of the following claims.

I claim:

1. In a plant for handling material such as coal, a tower providing an elevated bin of limited capacity, a distributing pocket at the top of said tower, means for transferring coal from a source of supply to said distributing pocket, a storage chute extending from said pocket, a passage for delivering coal from said pocket to said bin, means operative to pass coal from said pocket to said bin upon closure of said storage chute, and a chute for delivering coal from said bin to a truck or the like.

2. In a plant for handling material such as coal, an elevated platform, means for transferring coal from a source of supply to said elevated platform, a plurality of storage chutes extending from said platform to storage spaces, means for controlling the flow of coal through said chutes, an elevated bin of limited capacity below the level of said platform, means on said platform operative upon the closure of said storage chutes to pass coal from said platform to said elevated bin, and a chute for delivering coal from said bin to a truck or the like.

3. In a plant for handling material such as coal, a supply hopper, a tower, a conveyor for transferring coal from said hopper to said tower, an elevated bin of limited capacity carried by said tower, means on said tower for delivering coal alternatively to storage outside of said tower or to said bin, means for delivering coal from said bin, by gravity, to a truck or the like, and means for delivering coal from said bin to another storage point outside of said tower.

4. In a plant for handling material such as coal, a receiving hopper, an elevator for transferring coal from said hopper to an elevated platform, a plurality of storage chutes extending from said platform, means for stopping the flow of coal to said storage chutes, an elevated bin of limited capacity, an opening in said platform and communicating with said elevated bin, said opening being so positioned that coal delivered to said platform will flow through said opening only when the flow through said storage chutes is interrupted, and a chute for delivering coal from said bin to a truck or the like.

5. In a plant for handling material such as coal, a receiving hopper, an elevator for transferring coal from said hopper to an elevated distributing pocket, a bin of limited capacity and a plurality of storage points below the level of said pocket, a chute extending from said pocket to one of said storage spaces, a passage from said pocket to said bin, said passage being adapted to receive coal from said pocket when the flow through said chute is prevented, a chute for delivering coal from said bin to another of said storage spaces, and a chute for delivering coal from said bin to a truck or the like.

In testimony whereof, I affix my signature.

RUSSEL W. STEM.